United States Patent [19]
Focke

[11] Patent Number: 4,883,161
[45] Date of Patent: Nov. 28, 1989

[54] APPARATUS FOR THE FORM-STABILIZING STORAGE OF PACKS

[75] Inventor: Heinz Focke, Verden, Fed. Rep. of Germany

[73] Assignee: Focke & Co. (GmbH & Co.), Verden, Fed. Rep. of Germany

[21] Appl. No.: 38,261

[22] Filed: Apr. 14, 1987

[30] Foreign Application Priority Data

Apr. 22, 1986 [DE] Fed. Rep. of Germany ....... 3613482

[51] Int. Cl.⁴ ............................................ B65G 47/52
[52] U.S. Cl. ................................. 198/347; 221/113;
  414/788.8; 414/790.9; 414/797.9; 414/926
[58] Field of Search .................... 221/112, 121, 132;
  198/347; 414/37, 788.8, 790.9, 797.9, 926;
  34/187

[56] References Cited

U.S. PATENT DOCUMENTS

| | | | |
|---|---|---|---|
| 1,993,554 | 3/1935 | Kruse | 414/37 X |
| 3,193,139 | 7/1965 | Iannone et al. | 221/251 |
| 4,555,876 | 12/1985 | Ohtake | 414/131 X |
| 4,717,010 | 1/1988 | Deal et al. | 198/347 |
| 4,814,072 | 3/1989 | VonWichert et al. | 198/347 X |

FOREIGN PATENT DOCUMENTS

| | | |
|---|---|---|
| 11683518 | 9/1952 | Fed. Rep. of Germany . |
| 1556752 | 4/1970 | Fed. Rep. of Germany . |
| 2632968 | 1/1978 | Fed. Rep. of Germany . |
| 665506 | 1/1952 | United Kingdom . |
| 984766 | 3/1965 | United Kingdom . |

Primary Examiner—Robert J. Spar
Assistant Examiner—Janice Krizek
Attorney, Agent, or Firm—Sughrue, Mion, Zinn, Macpeak & Seas

[57] ABSTRACT

A (drying) turret (27) is used for the form-stablizing storage of cuboid packs with folding tabs connected by means of glue spots, and a plurality of pivotably mounted storage pockets (29), each intended for receiving a multiplicity of packs (20), is arranged on the periphery of this turret (27). The packs are introduced via a radially outer pushing-in orifice and are pushed out again in the axis-parallel direction via a radially inner pushing-out orifice. As a result, a dwell time amounting to several revolutions is obtained for the packs.

13 Claims, 9 Drawing Sheets

APPARATUS FOR THE FORM-STABILIZING STORAGE OF PACKS

DESCRIPTION

The invention relates to an apparatus for the temporary form-stabilizing storage of cuboid packs with folding tabs connected by adhesive bonding, especially soft cigarette packs which can be introduced into pockets of a rotating turret and which can be pushed out of this after a dwell time.

Drying turrets of this type are used, in conjunction with packaging machines, for those packs in which folding tabs are connected to one another by means of glue. This has to set or harden. For this, it is desirable for the packs to remain in the drying apparatus for as long a dwell time as possible. On the other hand, on high-performance packaging machines, such as those used above all for the packaging of cigarettes, a high throughput is necessary even in the region of the drying turret, and therefore this must have a correspondingly large capacity.

The object on which the invention is based is to provide an apparatus equipped with a turret and intended for the form-stabilizing storage of soft cigarette packs in particular, and which has the holding capacity increased even further in comparison with known apparatuses of this type and thereby makes it possible to ensure a longer dwell time for the packs, whilst maintaining a predetermined throughput rate.

To achieve this object, the apparatus according to the invention is characterized in that each pocket of the turret is designed for receiving a plurality of packs, and after one revolution the pack located in the pocket for the longest time can be pushed out and a new pack can be introduced into the pocket.

An apparatus of this type or a (drying) turret of this type can be operated so as to rotate continuously. Each pocket is designed for receiving a relatively large number of packs, preferably nine. The pockets, in the form of elongate containers, are directed radially relative to the turret body. After each revolution of the turret, the radially inner pack is pushed out of the pocket and a new pack is introduced into the pocket on the radially outer side (pushing-in orifice). Consequently, each pack is located in the pocket of the turret over a period of several revolutions. The shape of the pocket is such that the form of the packs is stabilised or adjusted during the setting of the glue.

Further features of the invention relate to the design of the pockets and of the members for introducing and pushing out the packs. Furthermore, according to the invention, measures are taken to make it possible for the turret or its pockets to run empty. For this purpose, the turret is changed over to intermittent operation. In the course of several revolutions, the packs are pushed out of the pockets in succession.

Solutions are also provided, to guarantee careful handling of the packs when the apparatus is started up, particularly at the beginning of a shift.

An exemplary embodiment of the apparatus is explained in detail below with reference to the drawings. In these.

Figure 1:
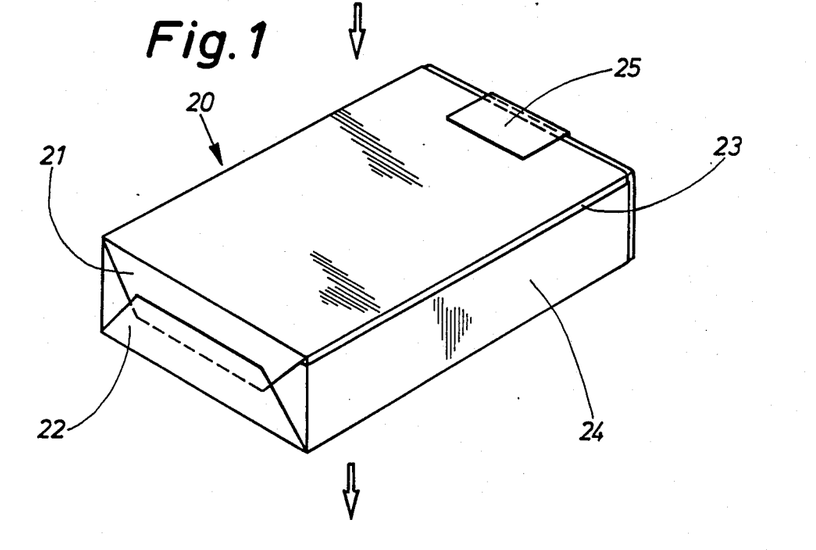
FIG. 1 shows a perspective representation of a soft cigarette pack.
Figure 2:
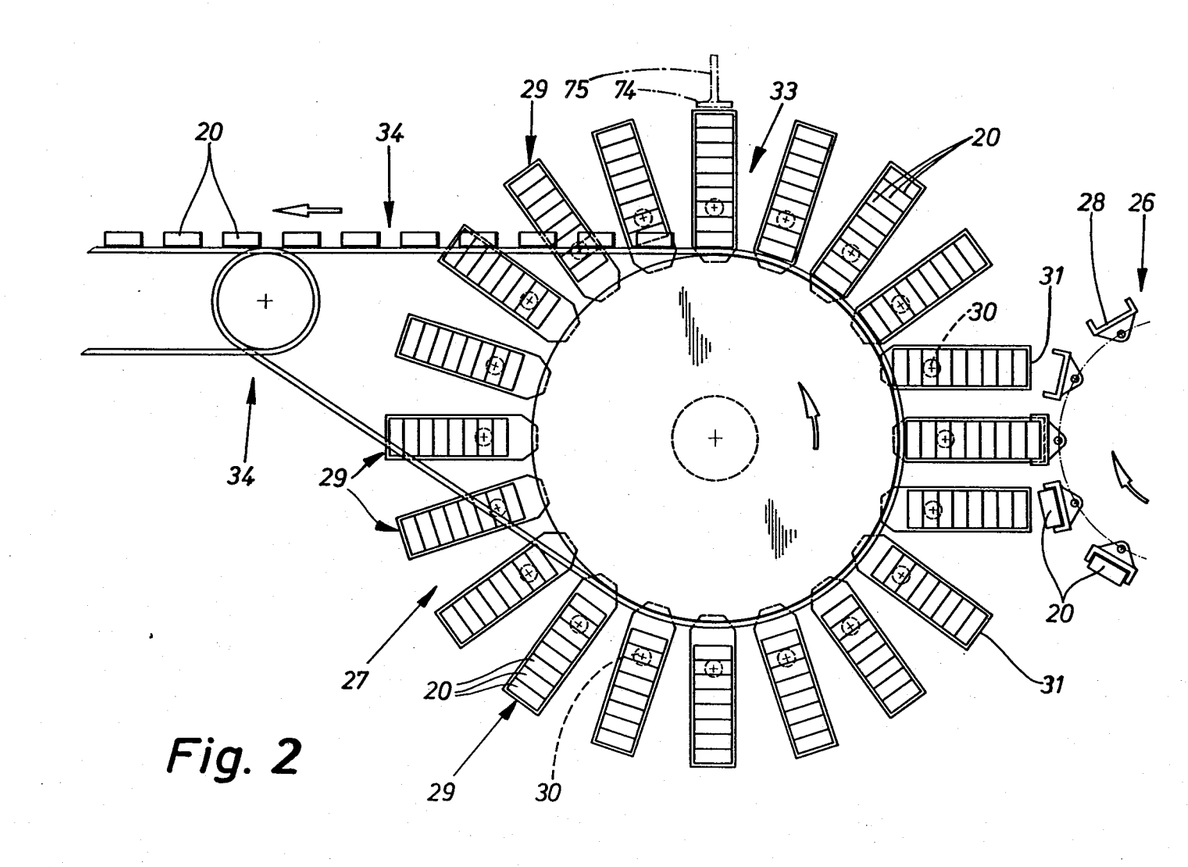
FIG. 2 shows a diagrammatic side view of the apparatus for the form-stabilizing storage of packs.

The apparatus illustrated serves for the reception and form-stabilizing storage of a relatively large number of cuboid packs 20. The apparatus is preferably suitable for receiving soft cigarette packs according to FIG. 1. These consist of an outer paper cup with trapezoidal bottom folding tabs 21 and 22 overlapping one another, and with side folding tabs 23 and 24 likewise overlapping one another and located in the region of one of the narrow side faces of the pack. Furthermore, in the region of an end wall there is a revenue band 25 (revenue stamp) which extends centrally and transversely over the latter and into the region of the front and rear walls of the pack.

Packs 20 of this type are produced in large quantities by a packaging machine (not shown). The packs 20 are fed individually to a (drying) turret 27 in succession by a delivery conveyor, in the present case a delivery turret 26. The delivery turret is equipped, along a periphery, with pack receptacles, namely with pivotable conveying pockets 28.

The main component of the apparatus is the turret 27. This is equipped, along its periphery, with a large number of storage pockets 29 which can each receive a relatively large number of packs 20 stacked close up against one another in the radial direction. In the present exemplary embodiment, each storage pocket 29 can receive up to nine packs 20.

Figure 3:
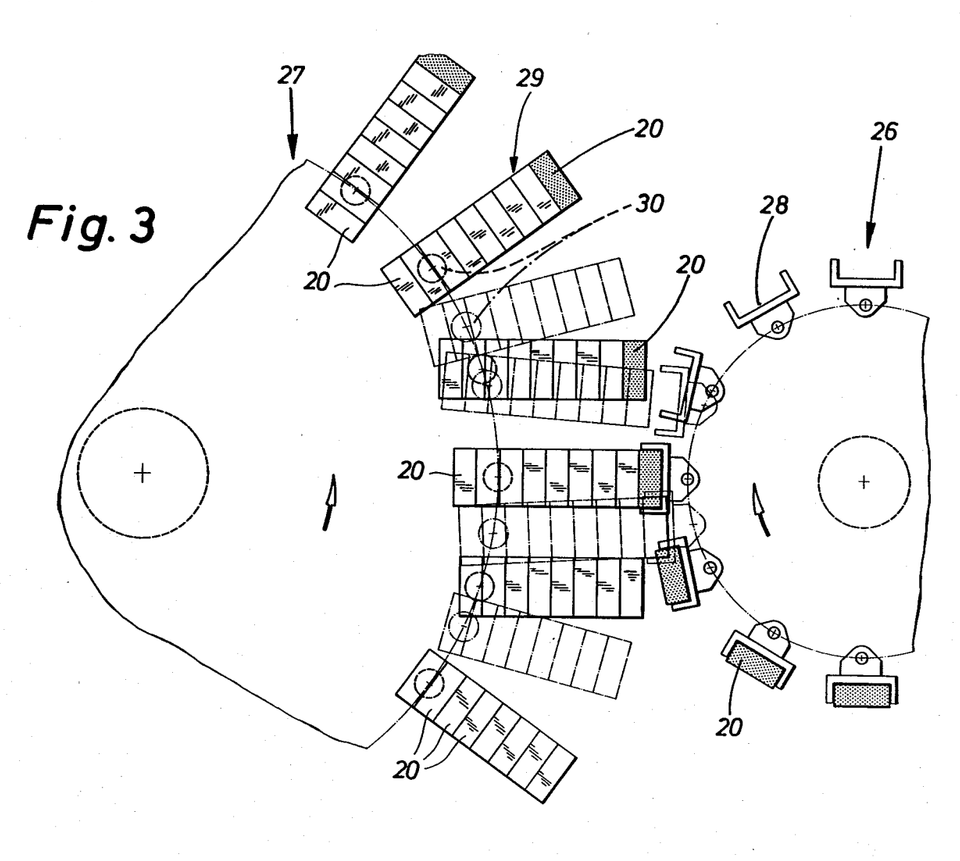
FIG. 3 shows part of the apparatus according to FIG. 2 on an enlarged scale, once again in a side view.
Figure 4:
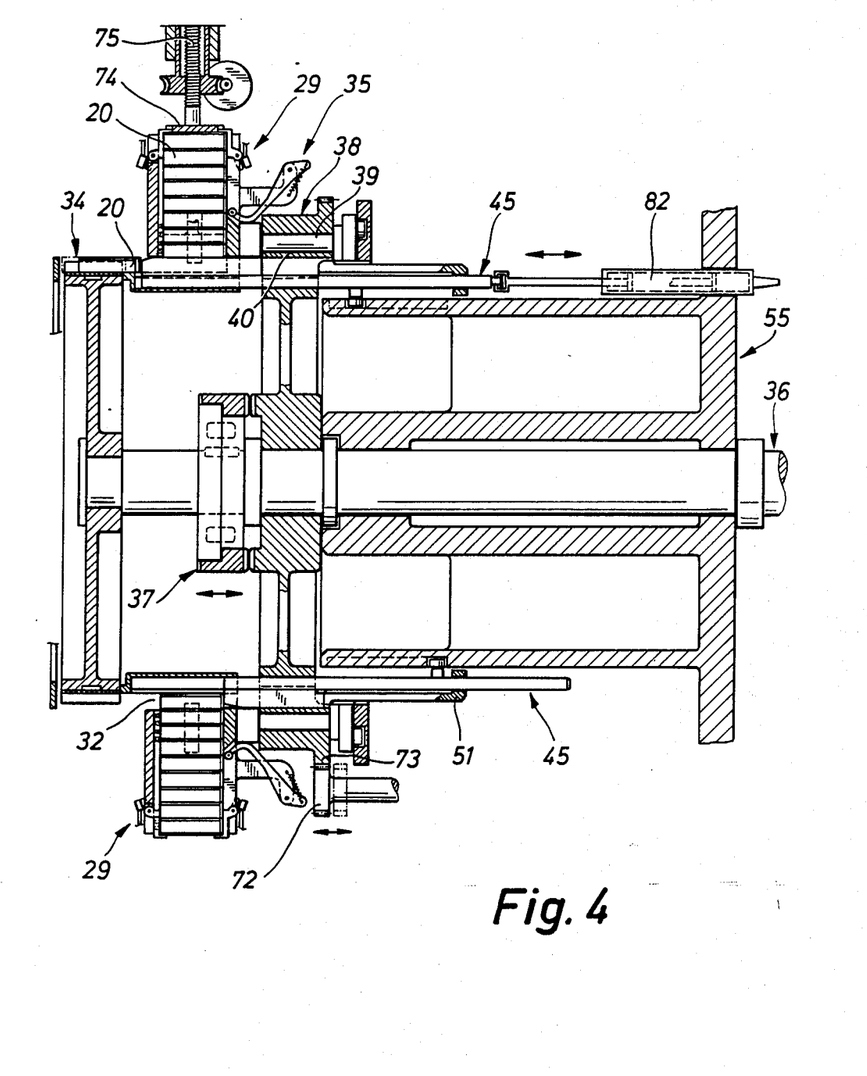
FIG. 4 shows a detail, namely a (drying) turret, in longitudinal section.

The storage pockets 29 are mounted radially aligned on the periphery of the turret 27. Over the predominant region of the periphery, the storage pockets 29 are directed radially. By means of a pivot bearing 30 adjacent to the radially inner region, the storage pockets 29 are pivotable and can be aligned locally into a position parallel to one another, in particular for receiving a pack 20 from the delivery turret 26. Here, this pack transfer takes place in the region on both sides of a horizontal mid-plane of the turret 27. During the continuous rotary movement of the delivery turret 26 and turret 27, the conveying pockets 28, on the one hand, and the storage pockets 29, on the other hand, are temporarily turned towards one another or directed relative to one another in such a way that the pack 20 is transferred from the conveying pocket 28 to the storage pocket 29. FIG. 3 shows the different positions of the pockets during this transfer operation.

The packs 20 enter the respective storage pockets 29 individually in the region of a radially outer pushing-in orifice 31, remain in these storage pockets 29 over several revolutions of the turret 27 and are finally pushed out of the storage pockets 29 again on the radially inner side via a pushing-out orifice 32. During the rotary movement of the turret 27, the packs 20 travel in steps within the storage pocket 29 from the radially outer position to the radially inner pushingout position. In the present example, the packs 20 are therefore located in the storage pocket 29 for a period of more than eight revolutions of the turret 27. During this time, glue spots in the region of the bottom folding tabs 21, 22 and side folding tabs 23, 24 harden or set.

The radially inner packs 20, the glue spots of which have set, are ejected in the region of a pushing-out station 33, approximately in the vertical mid-plane of the turret 27, specifically on the top side of this. Here, a pack discharge conveyor 34 runs in synchronism with the turret 27 and receives the packs 20 pushed out in the transverse direction or in a direction parallel to the axis of the turret 27. The pack discharge conveyor 34 is designed as a conveyor belt or pocket belt.

The turret 27 is constructed so that the storage pockets 29 are pivotably mounted laterally on a disc-shaped or wheel-shaped turret body 35. The turret body 35 is mounted rotatably on a central main shaft 36. The turret body 35 and consequently the turret 27 as a whole are driven continuously by means of this main shaft, specifically via an electromechanical clutch 37 which connects the turret body 35 to the main shaft 36 and disconnects it from this in drive terms.

The storage pockets 29 are mounted, offset in the axial direction, next to an outer supporting ring of the turret body 35. The pivot bearing 30 consists of a supporting journal 39 which is attached laterally to the storage pocket 29 and which is mounted rotatably in a transverse bore 40 of the supporting ring 38. Attached to the end of the supporting journal 39 on the side located opposite the storage pocket 29 is a pivoting arm 41 which penetrates by means of a guide roller 42 into a control groove 43 of a fixed control ring 44.

The control groove 43 extending allround is shaped so that, in the region where a pack 20 is received from the delivery turret 26, the storage pockets 29 execute a controlled pivoting movement, in such a way that the above-described transfer of the packs 20 can take place. In this, in the present relative arrangement, the storage pockets 29 are pivoted first in the anti-clockwise direction and then in the clockwise direction, until the pack 20 is received via the pushing-in orifice 31.

Each storage pocket 29 is assigned a pushing-out ram 45 which rotates together with the turret 27 and with the associated storage pocket 29. The pushing-out ram 45 consists of a ramrod 46, to the actuating end of which is attached a specially shaped ram head 47. A guide bore 48 in the supporting ring 38 is designed so that the ramrod 46 and the ram head 47 of widened cross-section can pass through the supporting ring 38. The ram head 47 is equipped with a lateral extension 49 which grasps the particular bottom or inner pack 20 of the storage pocket 29 in the region of the (upper) end wall, that is to say in the region of the side having the revenue band 25, and via the pushing-out orifice 32 conveys it out of the storage pocket 29 and onto the pack discharge conveyor 34 running laterally next to this. For this purpose, the storage pocket 29 is provided with a ram entry orifice 50 on the side located opposite the pushing-out orifice 32. The dimension of the extension 49 in the longitudinal direction is such that, in the end pushing-out position, the packs 20 remaining in the storage pocket 29 rest on the extension 49. This initially remains in the pushing-out position during the further movement of the storage pockets 29.

The pushing-out rams 45 or the ramrods 46 are additionally mounted in a thrust ring 51 which is connected to the supporting ring 38 and which extends in the peripheral direction. The axial movements of the pushing-out rams 45 are produced respectively by actuating rollers 52 which are connected to the ramrods 46 and which rest laterally on the ramrods 46 via journalS 53. The actuating rollers penetrate into a control groove 54 of a fixed cylindrical body 55. This is mounted on the main shaft 36 which rotates within the cylindrical body 55. The control groove 54 is therefore fixed in place. During the relative movement of the pushing-out rams 45 in relation to the supporting ring 38, the to-and-fro movement of the pushing-out rams 45 is obtained as a result of the shape of the control groove 54.

The storage pockets 29 are designed as shafts of rectangular cross-section suitable for receiving the packs 20. Shaft side walls therefore have a dimension corresponding exactly to the transverse dimensions of the pack 20 (length of the end face and bottom face). The dimensions of longitudinal shaft walls 58 and 59 are such that the bottom wall of the pack having the bottom folding tabs 21 and 22 is at a certain distance from the shaft side wall 56. In this region, the packs 20 are supported elastically within the storage pocket 29, in the present case by means of brushes 60 (brush wall) distributed over the entire outer surface of the shaft side wall 56. The pack 20 is accordingly supported on the two narrow longitudinal sides and on the end wall carrying the revenue band 25 by smooth surfaces, resting against them over their entire area, of the shaft side wall 57 and of the longitudinal shaft walls 58 and 59. The brushes 60 in the region of the shaft side wall 56 form an elastic support. In particular, they fix the folding and bonding of the bottom folding tabs 21, 22. For this purpose, the packs 20 are conveyed into the storage pockets 29 in the position shown in FIG. 1, that is to say with the outer bottom folding tab 22 pointing into the interior of the storage pocket 29. As a result of the design of the storage pocket 29, the cuboid shape of the packs 20 is aligned and stabilized during the setting process.

Figure 7:
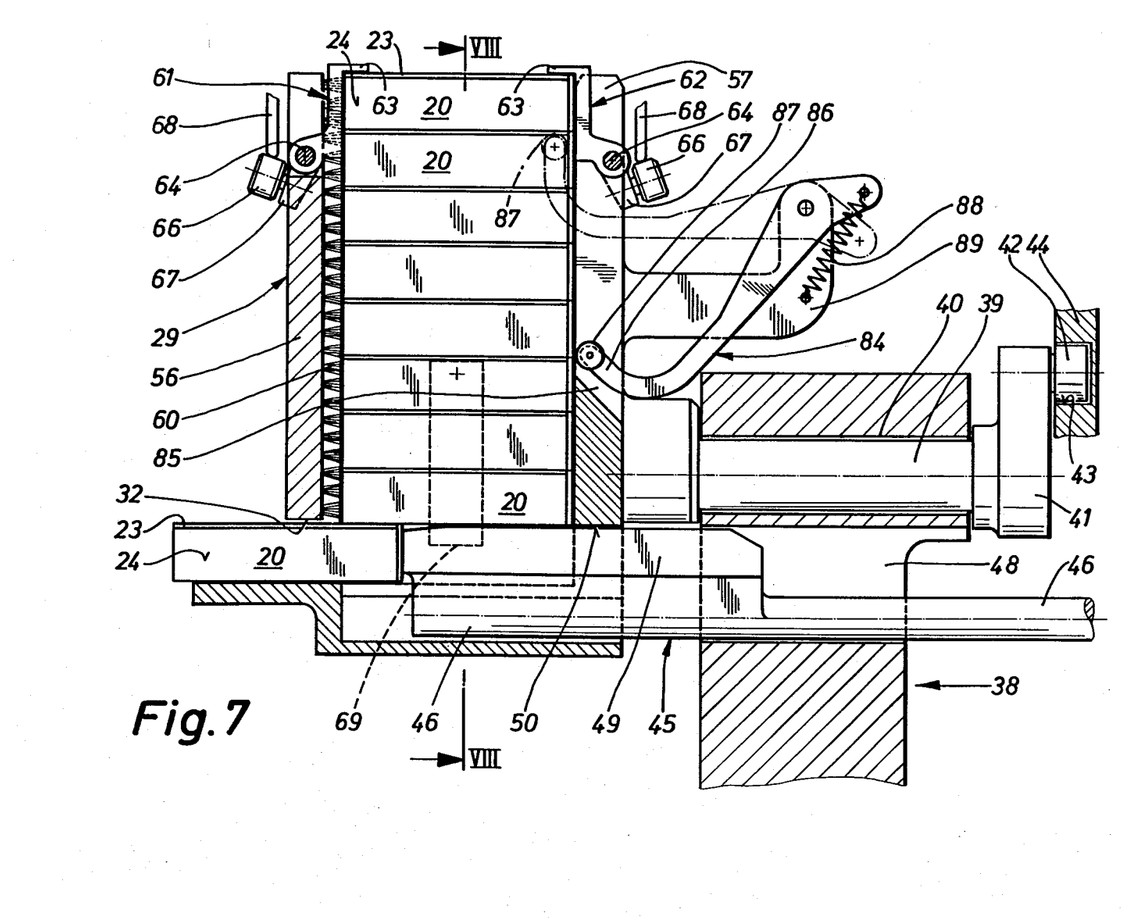
FIG. 7 shows a further detail of the turret according to FIG. 4, namely a pocket, in a radial section and on a further-enlarged scale.
Figure 8:
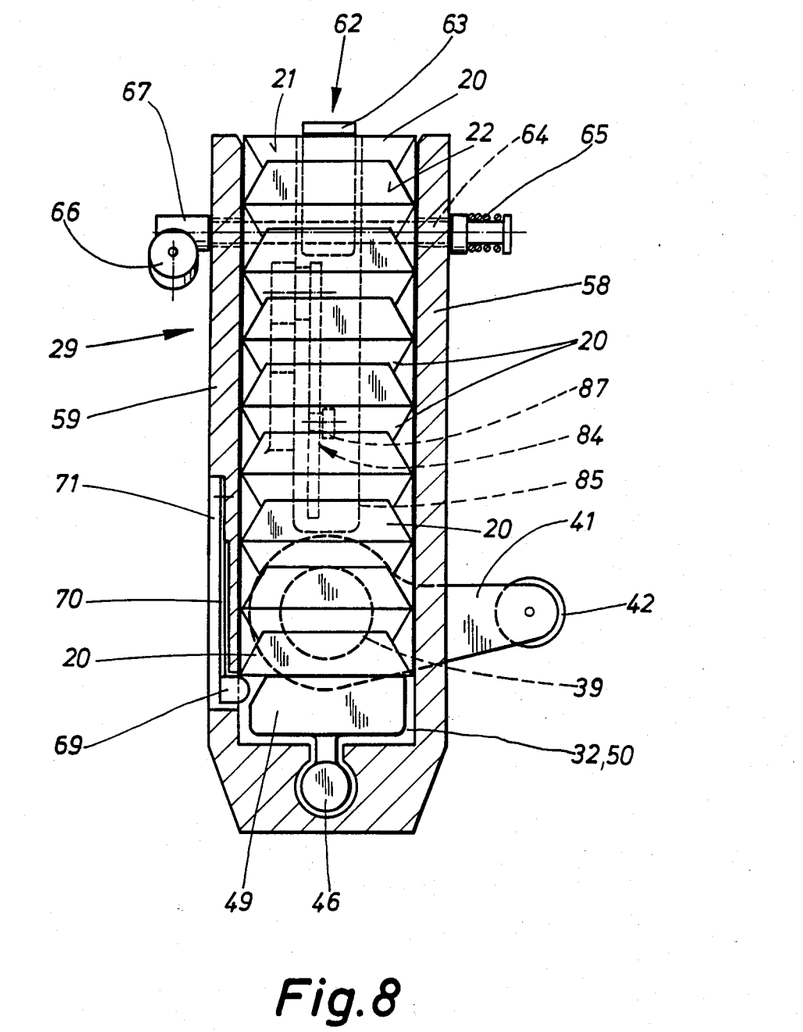
FIG. 8 shows a radial section through a pocket offset 90° relative to FIG. 7.
Figure 9:
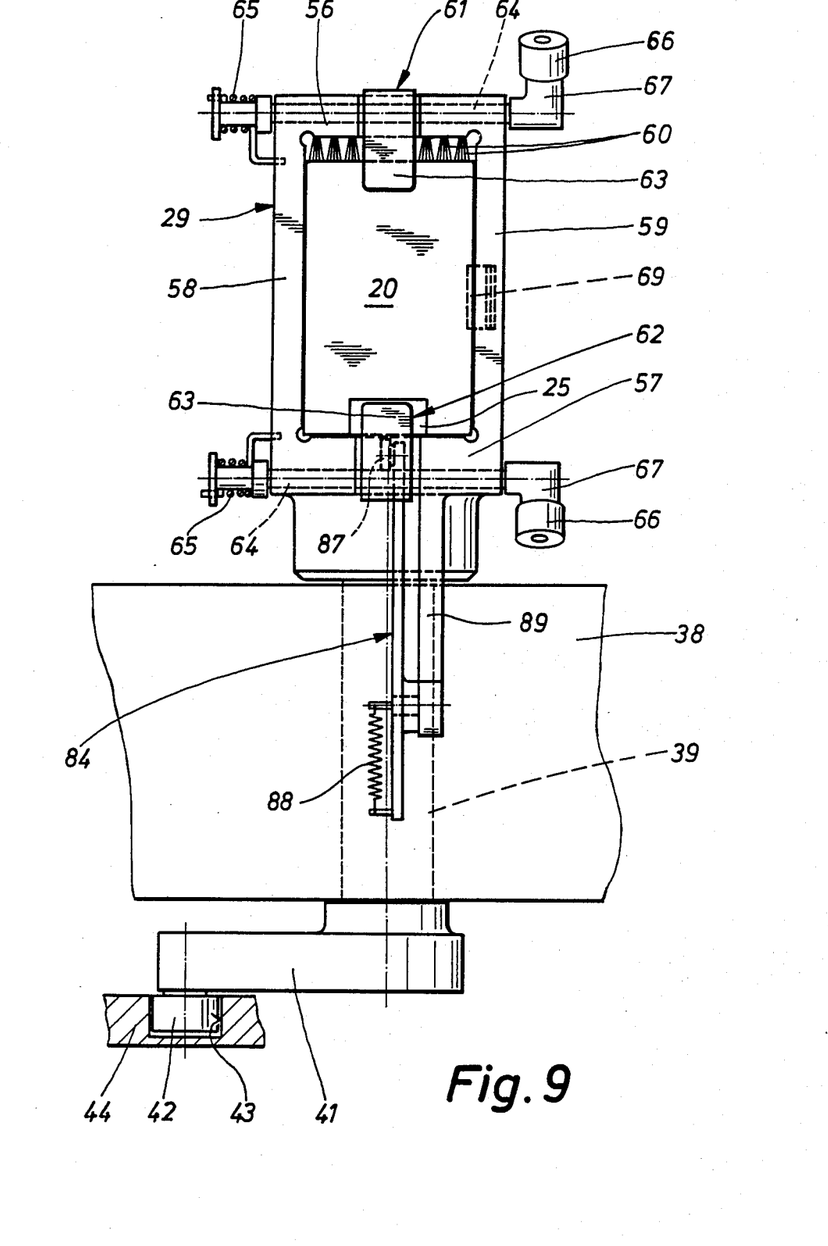
FIG. 9 shows a plan view of the pocket according to FIGS. 7 and 8.

The radially outer packs 20 in the region of the pushing-in orifice 31 are retained in their position by resiliently pivotable pawls 61, 62. These, in their working position, respectively grasp the outward-pointing front and rear sides of the pack by means of a horizontal leg 63. The pawls 61, 62 are mounted centrally in the region of the shaft side walls 56, 57 and are actuable by means of pivoting shafts 64. These are mounted rotatably in the shaft side walls 56, 57. The ends projecting laterally from these are, on the one hand, supported elastically via a helical spring 65, so that the pivoting shafts 64 rotate counter to the tension of the helical spring 65 or in response to its relaxation. On the opposite side, an actuating member in the form of a back-up roller 66 is attached. This rests on an inclined actuating extension 67 of the pawls 61, 62. The actuating extension 67 is located on the side of the pivoting shaft opposite the leg 63, so that the pawls 61, 62 are designed as a whole as two-armed levers. When the back-up roller 66 is subjected to pressure, the pawls 61, 62 are consequently pivoted in the opening direction. The pawls 61, 62 are loaded in the direction of the closing position, shown in FIG. 7, by the helical spring 65. In the regions required, that is to say in the region where the packs 20 are introduced into the pushing-in orifice 31 and in the region of the pushing-out station 33, the pawls 61, 62 are pivoted back, counter to the load of the helical springs 65, into a position in which the pushing-in orifice 31 is completely free. Here are arranged fixed back-up discs 68, onto which the respective back-up rollers 66 run as a result of the rotation of the turret 27, thereby pivoting the pawls 61, 62 in the opening direction.

As already explained, the packs 20 are shifted within the storage pockets 29 in the direction of the pushing-out orifice 32 by the pack 20 introduced at the pushing-in orifice 31. The ram head 47 or its extension 49 remains in the position within the storage pocket 29, immediately before the next pack 20 is transferred from the delivery turret 26. To prevent the packs 20 from tilting inside the storage pocket 29 after the pushing-out ram 45 has been retracted, the particular inner pack adjacent to the pushing-out orifice 32 is fixed elastically, specifically, in the present exemplary embodiment, by a resilient holding nose 69 which is mounted within the longitudinal shaft wall 59 in the lower region of the latter. The holding nose 69 is located on a long leaf spring 70 placed in a recess 71 of the shaft side wall 59. The holding nose 69 reaches under the lower or inner pack 20. When the next pack 20 is pressed into the storage pocket 29 via the pushing-in orifice 31, the rounded holding nose 69 is pressed aside by the fixed pack itself, so that the latter can assume the inner position in the region of the pushing-out orifice 32.

The apparatus described is also designed so that the storage pockets 29 are run empty, for example at the end of a work shift. Special measures are taken for this.

The drive of the turret 27 is changed over to intermittent operation. For this purpose, the drive connection to the main shaft 36 is broken by actuating the clutch 37. The turret 29 is now driven in steps via a pinion 72 which is brought into engagement with a toothed rim 73 on the outer periphery of the supporting ring 38 as a result of axial displacement. The storage pockets 29 now fed in succession to the pushing-out station 33 are emptied here in steps, each step corresponding to an individual pack 20. The turret 27 therefore executes several revolutions until all the storage pockets 29 are emptied completely.

Since no new packs enter the storage pockets 29 via the pushing-in orifice 31, a special member for shifting the packs 20 within the storage pockets 29 to the pushing-out orifice 32 is provided. For this purpose, in the pushing-out station 33 a thrust plate 74 can be lowered intermittently into the respective storage pocket 29, at the same time taking up or shifting the packs 20 still present in it. The thrust plate 74 is attached to a spindle 75 which is moved up and down by means of a rotatable spindle nut 76. This is driven, in turn, by a worm 77.

The particular pack 20 located in the region of the pushing-out orifice 32 is fed to the pack discharge conveyor 34 in the way described as a result of a pushing-out movement within the pushing-out station 33. For this purpose, the pushing-out ram 45 assigned to the particular storage pocket 29 can be moved to and fro independently and without the effect of the control groove 54. The free end of the ramrod 46 distant from the ram head 47 is equipped with an anchoring head 78 which, in the pushing-out station 33, is grasped positively by a claw 79 of a piston rod 80. This is movable by means of a piston 81 in an actuating cylinder 82. The latter is subjected to a pressure medium, especially to compressed air, and moves the piston 81 and consequently the pushing-out ram 45 in the pushing-out direction.

Figures 5, 10:
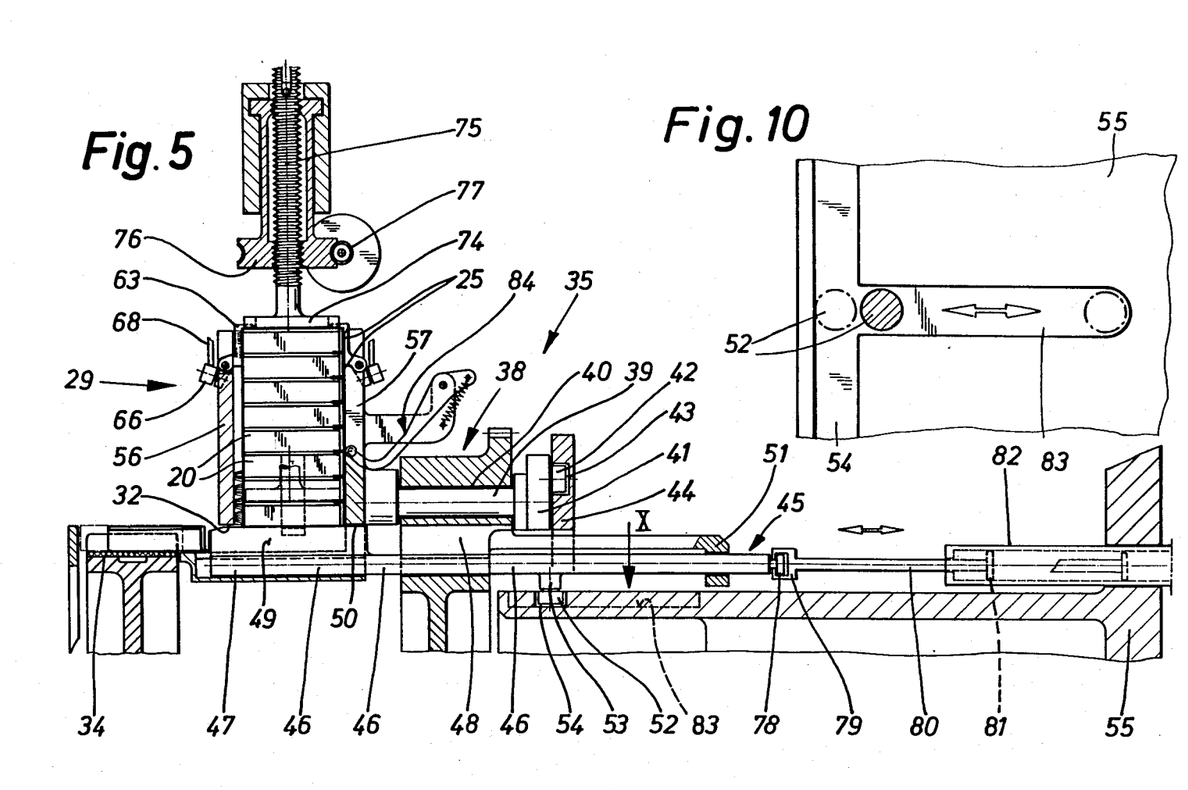
FIG. 5 shows a detail of the turret according to FIG. 4 on an enlarged scale, again in a longitudinal section.
FIG. 10 shows a plan view of a detail of the folding turret on an enlarged scale.
Figure 6:
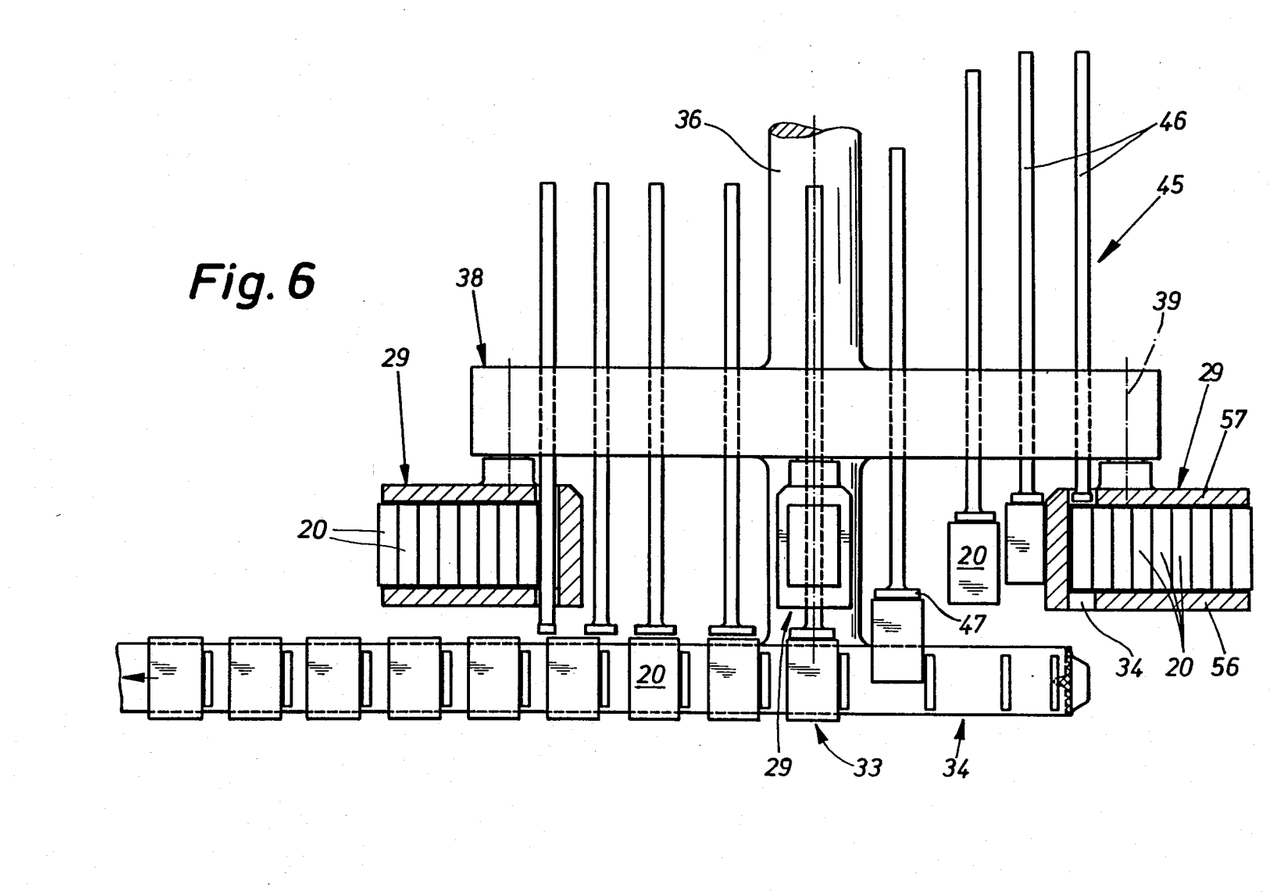
FIG. 6 shows details of the apparatus in a plan view, partially in horizontal section.

Since, in the pushing-out station 33, the pushing-out ram 45 moves independently of the control groove 54, the latter is provided with a branch groove 83 extending in the axial direction (FIG. 10). This makes it possible for the actuating roller 52 to leave the actual control groove 54 and enter the branch groove 53, so that the pushing-out ram 45 can execute the pushing-out movement.

Special measures are also taken for starting up the apparatus when the storage pockets 29 are still empty. In this case, the turret 27 rotates continuously. The packs 20 entering the storage pockets 29 in succession via the pushing-in orifices 31 are retained on the same side as the revenue band 25 by a supporting member which is displaced radially in the storage pocket 29 according to the content of the latter and which finally comes out of the storage pocket 29 again. As shown especially in FIG. 7, this is an angled or curved (two-armed) supporting lever 84 which by means of a supporting leg 86 enters the storage pocket 29 via a recess 85 in the region of the shaft side wall 57. A supporting roller 87 at the end of the supporting leg 86 comes up against the inward-directed side of the pack 20, specifically in the region of the leg of the revenue band 25 extended here. This at the same time guarantees that the revenue band 25, attached by adhesive bonding, but not yet fixed in position, is held in the exact position by being pressed against the pack 20. The supporting lever 84 only has to be effective over a part region of the content. As is evident from FIG. 7, the supporting lever 84 comes out of the storage pocket 29 by being pivoted counter to the force of a tension spring 88. The packs 20 subsequently introduced are sufficiently aligned as a result of the positively matching shape of the storage pocket 29. The revenue bands 25 are fixed in position as a result of the support of the packs 20 against one another.

The supporting lever 84 is mounted pivotably as a two-armed lever on a projecting arm 89 attached to the shaft side wall 57.

I claim:

1. Apparatus for the temporary form-stabilizing storage of cuboid soft cigarette packs with folding tabs connected by adhesive bonding, which can be introduced into pockets of a rotating turret and which can be pushed out of these after a dwell time, characterized in that each pocket is designed as a storage pocket (29) for receiving a plurality of packs (20), and after one revolution of the turret (27) the pack (20) located in the storage pocket (29) for the longest time is ejected and a new pack is introduced into the storage pocket (29); in that the storage pockets (29) are directed radially, and new packs (20) can be pushed into the respective storage pocket (29) via a radially outer pushing-in orifice (31) and the radially inner pack (20) can be pushed out of the storage pocket (29); and in that the radially inner pack (20) can be pushed out of the storage pocket (29) in the transverse direction, in a direction parallel to the axis of the turret (27), onto a pack discharge conveyor (34) running in a plane offset relative to the turret (27).

2. Apparatus for the temporary form-stabilizing storage of cuboid soft cigarette packs with folding tabs connected by adhesive bonding, which can be introduced into pockets of a rotating turret and which can be pushed out of these after a dwell time, characterized in that each pocket is designed as a storage pocket (29) for receiving a plurality of packs (20), and after one revolution of the turret (27) the pack (20) located in the storage pocket (29) for the longest time is ejected and a new pack is introduced into the storage pocket (29); in that the storage pockets (29) are directed radially, and new packs (20) can be pushed into the respective storage pocket (29) via a radially outer pushing-in orifice (31) and the radially inner pack (20) can be pushed out of the storage pocket (29); in that a pushing-out station (33) precedes a pushing-in station in the direction of rotation of the turret (27), and, after the radially inner pack (20) has been pushed out, a group of packs (20) located in a storage pocket (29) can be shifted radially an amount corresponding to the position of one pack (20) by means of the new pack introduced via the pushing-in orifice (31); and in that each storage pocket (29) is independently pivotable on the periphery of the turret (27), in such a way that, during the continuous rotation of the turret (27), the pushing-in orifice (31), in order to receive a pack (20), can temporarily be aligned with a delivery conveyor (26) or with pivotable conveying pockets (28) arranged on the latter.

3. Apparatus according to claim 2, characterized in that the storage pockets (29) are arranged laterally on a turret body (35) or on a supporting ring (38) of this and are connected pivotably to the supporting ring (38) via a supporting journal (39) mounted rotatably in the latter.

4. Apparatus according to claim 3, characterized in that the pivoting movement of each of the storage pockets (29) is controllable by means of a guide roller (42) which penetrates into a fixed control groove (43) and which acts on the supporting journal (39) of the storage pocket (29) via a pivoting arm (41).

5. Apparatus according to claim 3, characterized in that each storage pocket (29) is assigned a separate pushing-out ram (45) which is movable in an axis-parallel manner and by which the radially inner pack (20) can be moved out of the storage pocket (29) via a pushing-out orifice (32) and onto the pack discharge conveyor (34).

6. Apparatus according to claim 5, characterized in that the pushing-out rams (45) are mounted displaceably in the turret body (35) or supporting ring (38) and are actuable by means of an actuating roller (52) which is arranged laterally on the pushing-out ram (45) and which penetrates into a continuous fixed control groove (54).

7. Apparatus according to claim 5, characterized in that a ram head (47) arranged on the pushing-out ram (45) fills the cross-section of the storage pocket (29) in the region of the pushing-out orifice (32), essentially to an extent corresponding to one pack (20), and waits in the pushing-out position for a time corresponding to a portion of the peripheral movement of the turret (27).

8. Apparatus according to claim 5, characterized in that the pack (20) which is at the bottom or radially on the inside after a pack (20) has been pushed out of a storage pocket (29) is fixed elastically in the position next to the pushing-out orifice (32), by means of a holding nose (69) arranged on a leaf spring (70).

9. Apparatus according to claim 5, characterized in that, in order to empty the storage pockets (29), the turret (27) can alternatively be driven intermittently, in particular by uncoupling the turret (27) from a main shaft (36) and driving it by means of a pinion (72) via a toothed rim (73).

10. Apparatus according to claim 9, characterized in that in the region of the pushing-out station (33) is arranged an advance member which, when the turret (27) is stationary, enters the storage pocket (29) located in the pushing-out station (33) and which advances the packs (20) within the storage pocket (29) to the pushing-out orifice (32), in particular a thrust plate (74) actuable by means of a spindle (75).

11. Apparatus according to claim 10, characterized in that, when the storage pockets (29) are emptied completely and are stationary at the pushing-out station (33), the pushing-out rams (45) of the storage pockets (29) can be moved to and fro individually, preferably by means of a fixed pressure-medium cylinder (82) with a piston rod (80) connectable to the pushing-out ram (45).

12. Apparatus for the temporary form-stabilizing storage of cuboid soft cigarette packs with folding tabs connected by adhesive bonding, which can be introduced into pockets of a rotating turret and which can be pushed out of these after a dwell time, characterized in that each pocket is designed as a storage pocket (29) for receiving a plurality of packs (20), and after one revolution of the turret (27) the pack (20) located in the storage pocket (29) for the longest time is ejected and a new pack is introduced into the storage pocket (29); and in that each storage pocket (29) is assigned a supporting member movable out of this and in the form of a pivotable supporting level (84) which enters the storage pocket (29) through a pocket wall and which, when the storage pockets (29) start to be filled, supports the packs (20) during a particular phase, in the region of a revenue band (25).

13. Apparatus according to claim 12, characterized in that the supporting lever (84) is pressed by the packs (20) of the filling storage pocket (29) laterally out of this against a spring load (tension spring 88).

* * * * *